April 6, 1937. M. RUDOF Re. 20,323

METHOD OF MAKING TOOTH BRUSHES

Original Filed Sept. 19, 1933

Inventor
Morris Rudof:
By R. S. Burn
Attorney

Reissued Apr. 6, 1937

Re. 20,323

UNITED STATES PATENT OFFICE 20,323

METHOD OF MAKING TOOTH BRUSHES

Morris Rudof, Los Angeles, Calif.

Original No. 1,967,783, dated July 24, 1934, Serial No. 690,042, September 19, 1933. Application for reissue July 23, 1936, Serial No. 92,263

3 Claims. (Cl. 300—21)

This invention relates to a tooth brush and to the method of manufacturing same.

An object of the invention is to provide a tooth brush which is adapted to be positioned astride of the teeth and when so positioned, to present tufts of bristles toward the inner and the outer faces of the teeth and also toward the edges thereof, thus providing an arrangement of bristles such that the exposed surfaces of the teeth as well as the crevices therebetween may be cleansed by the brush in a single operation.

Another object is to provide a method of forming the brush whereby the desired arrangement of bristles may be readily produced.

With the foregoing objects in view together with such other objects and advantages as may subsequently appear, the invention resides in the parts and in the combination, construction and arrangement of parts and also in the steps and features hereinafter described and claimed and illustrated by way of example in the accompanying drawing in which:

Figure 1:
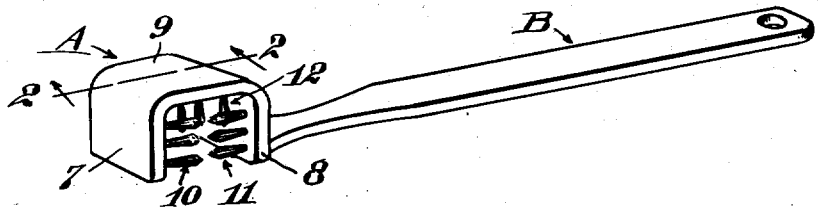
Fig. 1 is a perspective view of the tooth brush.

Referring to the drawing more specifically, A indicates generally the brush head which is of U shape formation; it including spaced parallel side walls 7 and 8 and a connecting top wall 9. Each of the walls 7, 8 and 9 are provided with groups of tufts of bristles indicated at 10, 11 and 12, respectively, which tufts project at right angles from the walls so that the ends of the tufts 10 extend toward the ends of the tufts 11 with their outer ends disposed close together, while the tufts 12 extend downwardly from the wall 9 and terminate between rows of the tufts 10 and 11 as particularly shown in Fig. 3.

By this arrangement, when the brush head is placed astride the teeth groups of the tufts of bristles will be disposed with their ends presented to the inner and the outer sides of the teeth and also to the edges thereof.

Figure 2:
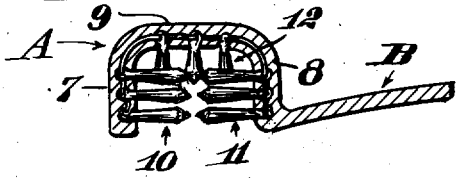
Fig. 2 is a view of the brush head as seen on the line 2—2 of Fig. 1.
Figure 3:
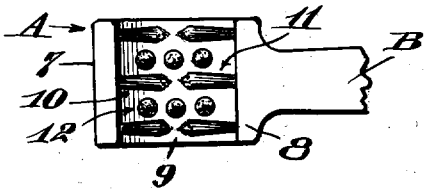
Fig. 3 is a view of the brush head as seen from the under side thereof.
Figure 6:
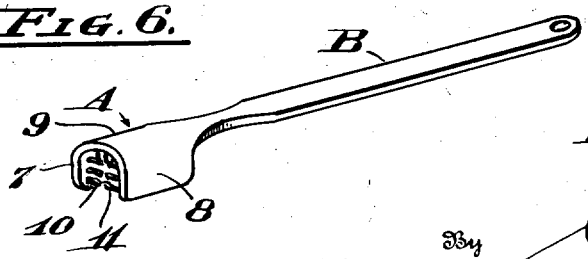
Fig. 6 is a perspective view illustrating a modified arrangement of the handle connection to the brush head.

The brush head A is equipped with a handle B which, as shown in Figs. 1, 2 and 3, leads from the side wall 8 so as to extend at right angles to the channel formed in the brush head. In Fig. 6 the handle is shown as extending from one end of the top wall 9 thus leading in the direction of the length of the channel in the brush head.

Figure 4:
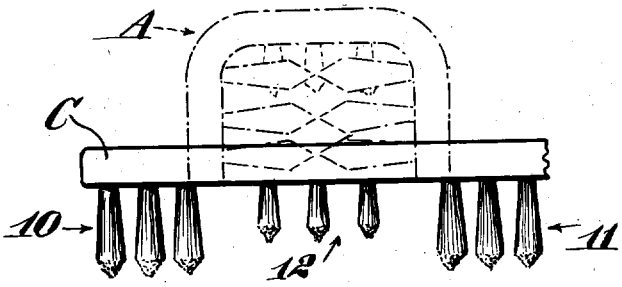
Fig. 4 is a view in side elevation showing in full lines the manner of initially forming the brush head and indicating in dotted lines the manner of bending the brush head to produce the finished shape.
Figure 5:
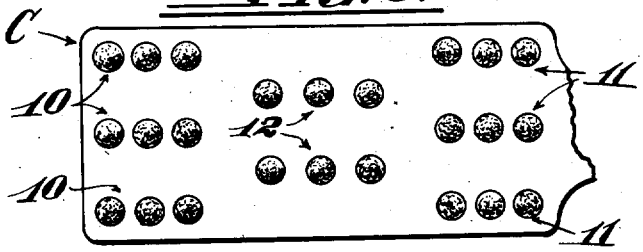
Fig. 5 is a plan view of the brush head shown in Fig. 4, illustrating the manner of arranging the tufts of bristles thereon.

In forming the brush head, a flat strip C of suitable material is provided, as shown in Figs. 4 and 5, on which is arranged the several groups of the tufts of bristles 10, 11 and 12, with the rows of the tufts of bristles 12 disposed in off-set relation to the rows of the tufts of bristles 10. After thus mounting the bristles on the strips C the latter is bent as indicated in dotted lines in Fig. 4, thus disposing the bristles in their desired relative positions as before described. The material of which the brush head is made is such as to be hard at normal temperatures, but which may be softened by subjecting it to the action of heat and then bent to the desired shape, or it may be a material that may be softened by subjecting it to the action of a chemical and thereafter caused to harden.

I claim:

1. The method of forming a tooth brush consisting in mounting three groups of tufts of bristles on a flat backing strip to project from one side thereof with the bristles in the intermediate group of shorter length than the bristles of the end groups and arranged in rows off-set relative to the rows of bristles in the end groups, and bending said backing strip into U-shape form with the bends extending between the intermediate group of bristles and the end groups of bristles, said bends being made in a direction to position the bristles to project inwardly toward each other.

2. The method of forming a tooth brush consisting in mounting a row of three groups of tufts of bristles on a flat backing strip to project from one side thereof with the adjacent groups spaced apart, and then bending said backing strip into U-shape form with the bends extending between the intermediate group of bristles and the end group of bristles, such bends being made in a direction to position the bristles to project inwardly toward each other.

3. The method of forming a tooth brush consisting in mounting three groups of tufts of bristles on a flat backing strip to project from one side thereof with the bristles in the intermediate group of shorter length than the bristles of the end group, and then bending said backing strip into U-shape form with the bends extending between the intermediate group of bristles and the end group of bristles, such bends being made in a direction to position the bristles to project inwardly toward each other.

MORRIS RUDOF.